July 14, 1931.  J. BENKERT ET AL  1,814,582
SMOKE CLEANER
Filed Aug. 6, 1930  2 Sheets-Sheet 1
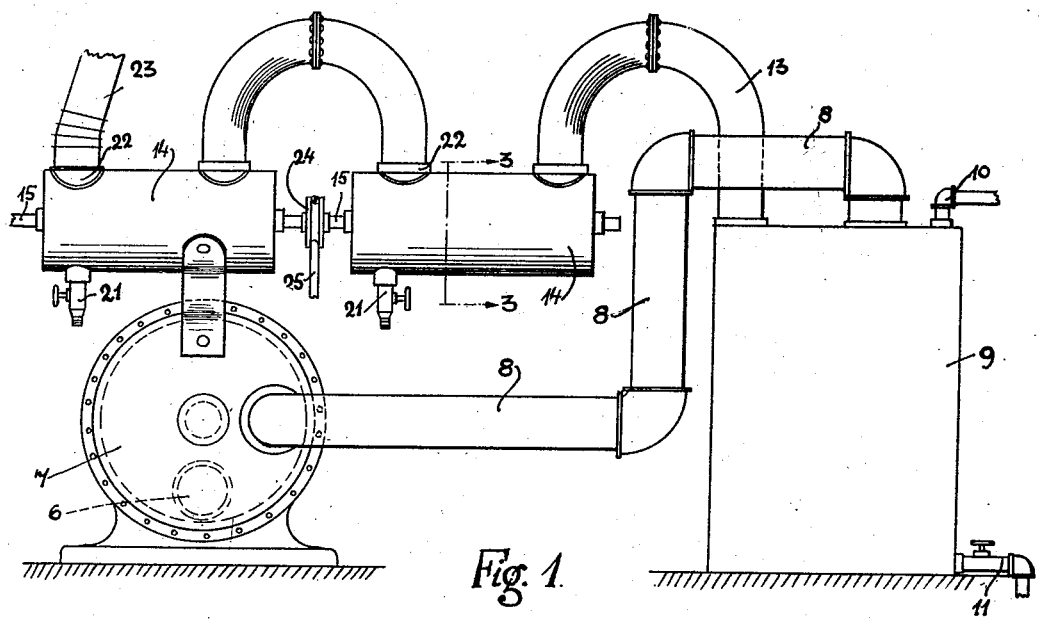
Fig. 1.
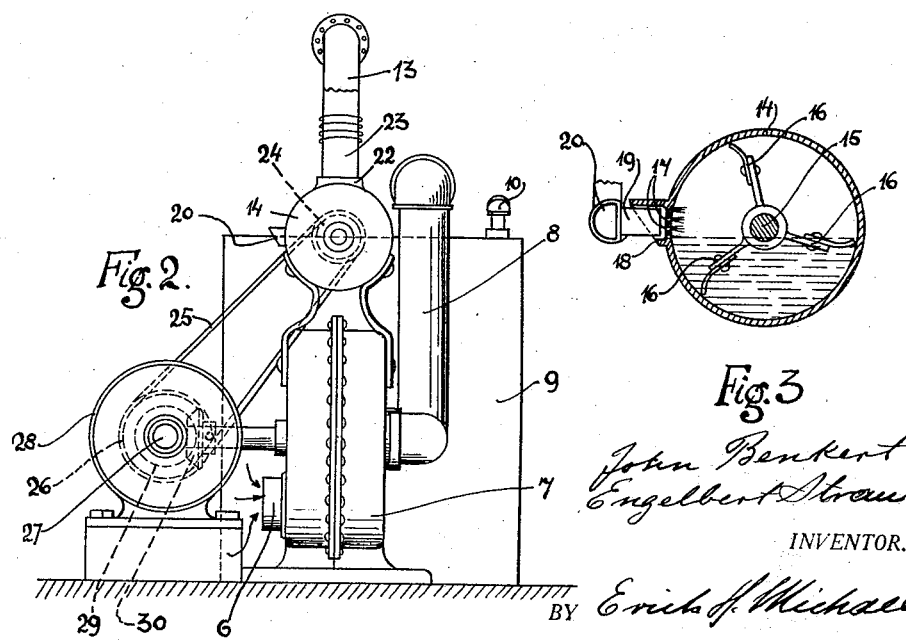
Fig. 2.
Fig. 3
John Benkert
Engelbert Straub
INVENTOR.
BY Erich J. Michaelis
ATTORNEY.

July 14, 1931.  J. BENKERT ET AL  1,814,582
SMOKE CLEANER
Filed Aug. 6, 1930   2 Sheets-Sheet 2
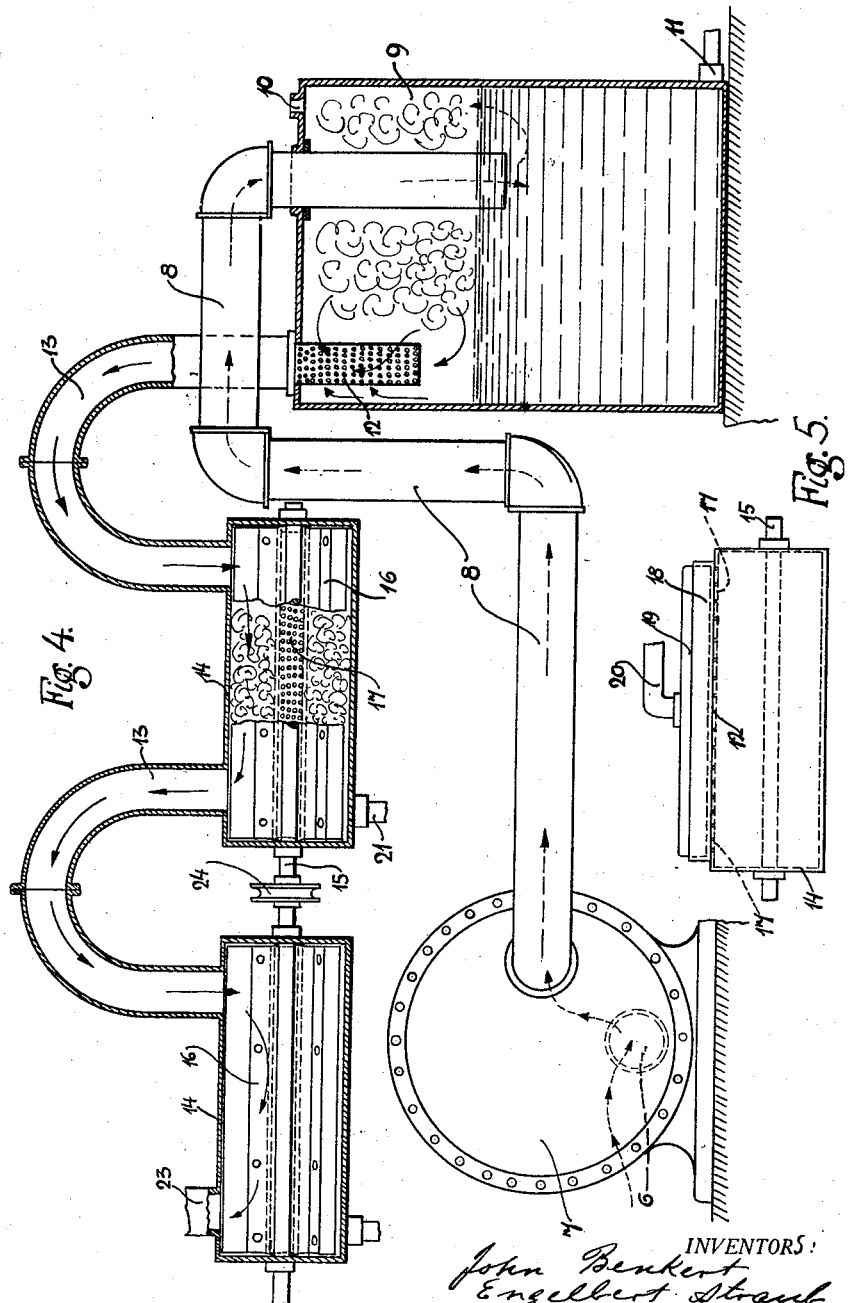

Patented July 14, 1931

1,814,582

UNITED STATES PATENT OFFICE

JOHN BENKERT AND ENGELBERT STRAUB, OF CHICAGO, ILLINOIS

SMOKE CLEANER

Application filed August 6, 1930. Serial No. 473,428.

The invention relates to smoke cleaners and the object of the invention is to provide a means for eliminating the unburnt particles of fuel from the smoke.

A further object of the invention is to provide a flue, through which the smoke to be cleaned is conducted and which leads said smoke through one or more containers, where the smoke is forced either through water or at least into contact with water.

Other objects of the invention not specifically mentioned will be easily ascertained and understood from the following description on hand of the accompanying drawings forming a part thereof. It is however to be noted that the invention is not to be limited or restricted to the exact construction or formation shown in the drawings and described in the specification, but that it should only be limited by the scope of the claims appended hereto.

In the drawings illustrating a preferred embodiment of the invention

Fig. 1 is a diagrammatical view of a smoke cleaner according to the present invention.

Fig. 2 is an end view of Fig. 1.

Fig. 3 is a sectional view taken on line 3—3 in Fig 1.

Fig. 4 is a view similar to Fig. 1, but partly shown in section, and

Fig. 5 is a detail top view of one of the sprinkler washers used in connection with the present invention.

A pipe 6 is adapted to be connected with the conduit for gases of combustion of a heating or power plant or the like. Said pipe ends in a blower 7 forcing said gases through a flue 8 into a container 9. This container is adapted to be filled with water which enters said container through a pipe line 10 and may be drained from said container through a drain pipe 11. The last member of the flue 8 extends so far into the container, that its open end is submerged under the level of the water.

A sieve tube 12 extends also into the container but ends above the water level.

A smoke conduct 13 is connected with the end of the sieve tube outside the container and communicates at its other end with the inlet of a sprinkler washer, which is preferably constructed as follows:

The sprinkler washer as shown has a cylindrical body 14, which is closed on both ends. A shaft 15 extends axially through the washer and is journalled in the end walls. Wings 16 are fastened in any convenient manner to said shaft and extend practically over the entire inner length of the cylinder.

On one portion of the cylinder 14 a plural of sprinkler holes 17 are provided as shown in Figs. 3, 4, and 5. An elongated sleeve 18 is formed on the outside of said cylinder so that the sprinkler holes will be located in the end of said sleeve. A mouth piece 19 fits into the elongated sleeve and a pipe 20 is adapted to conduct water under pressure through said mouth piece into said sleeve from where it is to be forced through the sprinkler holes into the cylinder. The holes are preferably arranged in horizontal rows, and the water collecting in the cylinder may be let off through a drain pipe 21.

The cylinder is provided with an outlet 22 and to this outlet either a second conduit 13 may be attached leading to a second sprinkler washer or a stove pipe 23 may be connected with said outlet leading to a smoke stack (not shown).

On the shaft 15 a pulley 24 may be rigidly mounted and a belt 25 trained over said pulley and a second pulley 26 rigidly mounted on the shaft 27 of a motor 28 may rotate the sprinkler shaft 15.

From the same motor the blower 7 may be driven for instance, by means of bevel gears 29 and 30 as indicated in Fig. 2.

The smoke cleaner operates in the following manner:

When pipe 6 is connected with the flue of a heating plant or the like the smoke from said plant will be forced through the flue 8 into the water in the container 9. The gases of combustion and the lighter particles of unburnt fuel, soot and the like will rise, while the heavier particles will stay in the water, either sinking therein or floating thereon according to their gravity.

The smoke will leave the container through the sieve tube 12, where coarse but light particles of sunburnt fuel will be removed from the smoke or gases of combustion.

Said gases will then follow the conduit 13 into the sprinkler washer. The rotation of the sprinkler shaft and the wings thereon, will force the gases of combustion into intimate contact with the fine spray of water entering through the sprinkler holes 17. Here the gases of combustion are relieved of most of the remaining unburnt fuel particles, and if desired, a plurality of washers may be arranged communicating with each other as indicated in Figs. 1 and 4. In this manner the gases of combustion may be cleaned until only gases are left, which are then conducted through the stove pipe 23.

Having described our invention and how the same is to be performed we claim as new and desire to secure by Letters Patent:

1. In a device of the class described a blower adapted to receive gases of combustion from a heating plant, a water container, a conduit leading from said blower into the container and ending underneath the water level, a sieve tube extending into the container, and a tank connected with a source of water, communicating with the sieve tube, and having an outlet for gases of combustion.

2. In a device of the class described a blower adapted to receive gases of combustion from a heating plant, a water container, a conduit leading from the blower into the container and ending underneath the water level, a sieve tube extending into the container and ending above the water level, a cylindrical tank, a shaft rotatably mounted in said tank and extending axially therethrough, a wing rigidly fastened to said shaft inside of the tank a pipe connecting said sieve tube with the tank, and means for spraying water under pressure radially into said tank, said tank having an outlet for gases of combustion.

In witness whereof we affix our signatures.

JOHN BENKERT.
ENGELBERT STRAUB.